United States Patent
Robbers

(10) Patent No.: US 11,067,274 B2
(45) Date of Patent: Jul. 20, 2021

(54) FLUE GAS EXHAUST SYSTEM, DUCT, INDUSTRIAL FURNACE, AND PLANT

(71) Applicant: TECHNIP FRANCE, Courbevoie (FR)

(72) Inventor: Jacobus Robbers, Courbevoie (FR)

(73) Assignee: TECHNIP FRANCE, Courbevoie (FR)

( * ) Notice: Subject to any disclaimer, the term of this patent is extended or adjusted under 35 U.S.C. 154(b) by 181 days.

(21) Appl. No.: 16/315,583

(22) PCT Filed: Jul. 6, 2017

(86) PCT No.: PCT/EP2017/066966
§ 371 (c)(1),
(2) Date: Jan. 4, 2019

(87) PCT Pub. No.: WO2018/007537
PCT Pub. Date: Jan. 11, 2018

(65) Prior Publication Data
US 2019/0257518 A1     Aug. 22, 2019

(30) Foreign Application Priority Data

Jul. 6, 2016   (EP) ..................................... 16178182

(51) Int. Cl.
*F23J 15/06* (2006.01)
*C01B 3/34* (2006.01)
(Continued)

(52) U.S. Cl.
CPC .................. *F23J 15/06* (2013.01); *C01B 3/34* (2013.01); *F22B 33/18* (2013.01); *F22B 37/02* (2013.01);
(Continued)

(58) Field of Classification Search
CPC ............ F23J 15/006; F23J 15/06; F22B 37/02
See application file for complete search history.

(56) References Cited

U.S. PATENT DOCUMENTS 2,826,264 A * 3/1958 McIlvaine ................ F23J 15/00
55/309
3,003,517 A    10/1961 Blaskowski
(Continued)

FOREIGN PATENT DOCUMENTS

| GB | 1119794 A | 7/1968 |
| GB | 2054116 A | 2/1981 |

(Continued)

OTHER PUBLICATIONS

International Search Report and Written Opinion dated Sep. 12, 2017 issued in corresponding International Patent Application No. PCT/EP2017/066966.

*Primary Examiner* — Nathaniel Herzfeld
(74) *Attorney, Agent, or Firm* — Locke Lord LLP; Alan B. Clement

(57) ABSTRACT

The present disclosure relates to a flue gas exhaust system for an industrial furnace, especially a steam reforming furnace. The flue gas exhaust system comprises a stack having an inlet opening for introducing flue gas into the stack and an outlet opening for exhausting flue gas. The inlet opening of the stack is in fluid connection to an outlet of a heat recovery system of the industrial furnace. Further, the fluid connection between said heat recovery system outlet and said stack inlet opening comprises a transition flue gas duct that at least partly embraces a part of the stack.

19 Claims, 2 Drawing Sheets

Figure 1:
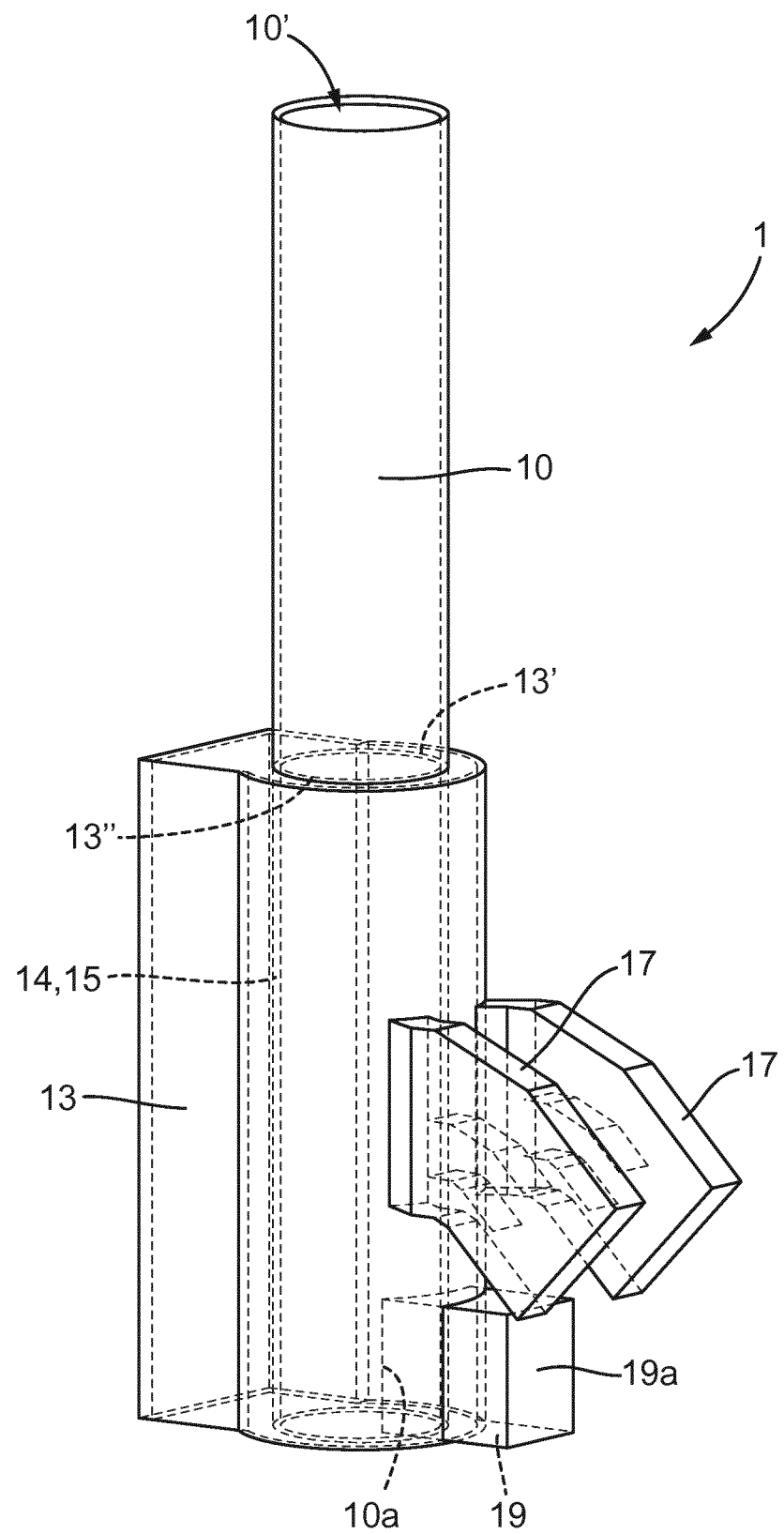

(51) Int. Cl.
*F22B 33/18* (2006.01)
*F22B 37/02* (2006.01)
*F22B 37/36* (2006.01)

(52) U.S. Cl.
CPC ...... *F22B 37/36* (2013.01); *C01B 2203/0205* (2013.01); *C01B 2203/0233* (2013.01); *C01B 2203/061* (2013.01); *C01B 2203/068* (2013.01); *C01B 2203/84* (2013.01); *Y02P 20/10* (2015.11)

(56) References Cited

U.S. PATENT DOCUMENTS

| | | | | |
|---|---|---|---|---|
| 3,527,177 | A | * | 9/1970 | LaRue ...................... F23J 15/06 110/346 |
| 4,033,269 | A | * | 7/1977 | Little ....................... F23J 11/00 110/160 |
| 4,168,958 | A | * | 9/1979 | Hartman ................. B01D 47/06 96/370 |
| 5,247,907 | A | | 9/1993 | Lee et al. |
| 5,461,853 | A | | 10/1995 | Vetterick |
| 5,575,243 | A | | 11/1996 | Vetterick |
| 6,340,002 | B1 | * | 1/2002 | Liebig ................ B01D 53/8631 122/4 D |
| 6,394,008 | B1 | | 5/2002 | Bauver, II et al. |
| 8,623,286 | B2 | * | 1/2014 | Iijima ................... B01D 53/346 422/168 |
| 2008/0161428 | A1 | * | 7/2008 | Strait ...................... C07C 67/36 518/702 |
| 2010/0031624 | A1 | * | 2/2010 | Austin .................... F02C 7/224 60/39.5 |

FOREIGN PATENT DOCUMENTS

| | | |
|---|---|---|
| GB | 2358904 A | 8/2001 |
| WO | 2009/049498 A1 | 4/2009 |

* cited by examiner

FLUE GAS EXHAUST SYSTEM, DUCT, INDUSTRIAL FURNACE, AND PLANT

CROSS-REFERENCE TO RELATED APPLICATIONS

This Application is a U.S. National Stage application under 35 U.S.C. 371 of International Application No. PCT/EP2017/066966 filed Jul. 6, 2017, which claims the benefit of and priority to European Patent Application No. 16178182.8 filed on Jul. 6, 2016. The contents of these above referenced patent applications are hereby incorporated by reference in their entirety.

The present disclosure relates to a flue gas exhaust system for an industrial furnace. In particular, the present disclosure relates to a flue gas exhaust system for a steam reforming furnace or a so-called fired steam reformer.

Steam reforming furnaces and other industrial furnaces are known for a long time. In case of a known steam reforming furnace or so-called fired steam reformer, flue gas exiting said fired steam reformer subsequently passes through a heat recovery system, usually formed by a so-called convection section, that allows for heat recovery of heat from the hot flue gas stream.

Generally, the recovery of the heat is performed by means of an assembly of heat recovery coils placed inside a main convection section duct. Due to the heat recovery, the flue gas cools down, which may result in a pressure drop between the gas pressure at the location of the inlet of the convection section and the gas pressure at the location of the outlet of the convection section. Therefore, in a typical convection section, a fan is placed right after the last heat recovery coils in order to compensate for the pressure drop and in order to facilitate an appropriate extraction of the flue gas from the convection section. Typically, the fan is connected directly to a flue gas stack that allows for the dispersion of the flue gas in the atmosphere at a relatively high elevation. This results in a common conventional plot arrangement having a modular sequence in which the last coils of convection section are followed by a fan inlet leading flue gas to a fan from which said flue gas subsequently is led away to a stack. The plot space required by this arrangement is usually dictated at least partly by the ducting between the modules that is necessary to connect each of these individual modules to each other.

In order to save on the plot space, the convection section, forming at least a part of the heat recovery system, is often placed in a vertical configuration. However, it has been found that such a vertical convention section configuration is disadvantageous with respect to a horizontal convection section configuration for different reasons. For example, a vertical configuration may require more building materials, e.g. a higher amount of steel may be needed, which may result in relatively high investment costs. As another example, it has been found that the cleaning of coils and replacement of coils is much easier and less costly in a horizontal convection section compared to a vertical configuration. The accessibility of the coils is indeed a critical aspect on the life cycle of the plant and the maintenance operations. Besides, one of the biggest advantage of horizontal convection section layouts over vertical convection section layouts lays in the then relatively simple design of boiler coils (in which water is evaporated into steam) that are operated under natural (fluid) circulation. During use, the steam generated in the coils will then flows upwards to a boiler outlet manifold due to a density difference. This is in contrast to boiler tubes placed in a horizontal configuration, in which there is no preferred flow direction. In addition, the fact that boiler coils can be hanged in a vertical position in a horizontal convection section layout simplifies the type of support needed compared to horizontally placed boiler coils that may require the use of tube-sheets or other relatively elaborated supporting structures. Besides, it is noted that the weight of the fan is usually of great importance for the constructability of a vertical convection section, because the amount of structural steel needed to fix the fan on top of the convection section increases significantly with an increased convection section height. The horizontal convection section layout does not suffer from the problem that the amount of structural steel needed to fix the fan increases significantly when the length of the convection section increases.

It is an object of the present disclosure to provide an alternative plant, especially an alternative steam reforming plant. Additionally or alternatively, it is an object of the present disclosure to provide an alternative industrial furnace and/or or an alternative flue gas exhaust system for an industrial furnace. In particular, it can be an object of the disclosure to provide a plant, industrial furnace and/or flue gas exhaust system, wherein at least one of the disadvantages of the prior art plants, prior art industrial furnaces and/or prior art flue gas exhaust systems is counteracted. More in particular, the disclosure may aim to provide a plant, industrial furnace and/or flue gas exhaust system, wherein at least one of the disadvantages mentioned above is counteracted. In embodiments, the disclosure aims at providing a flue gas exhaust system for an industrial furnace, especially for a steam reforming furnace, which on the one hand can be relatively economic to construct and/or relatively economic in use, and which on the other hand can allow for a relatively small plot space.

Thereto, the present disclosure provides for a flue gas exhaust system for an industrial furnace, especially a steam reforming furnace or so-called fired steam reformer, which comprises a stack having an inlet opening for introducing flue gas into the stack and an outlet opening for exhausting flue gas, wherein the inlet opening of the stack is in fluid connection to an outlet of a heat recovery system of the industrial furnace, and wherein the fluid connection between said heat recovery system outlet and said stack inlet opening comprises a transition flue gas duct that at least partly embraces a part of the stack. Thus the flue gas in the transition flue gas duct at least partly embraces the outside wall of the part of the stack 10.

By arranging the transition flue gas duct between the outlet of the heat recovery system and the inlet opening of the stack such that it at least partly embraces a part of the stack, at least a part of the stack wall or walls can be integrated within the transition flue gas duct. Hence, such an arrangement may lead to a reducing in flue gas ducting, which for example may result in relatively low investment costs for the construction of such a flue gas exhaust system.

Additionally or alternatively, another result of such an arrangement may be that only a relatively small plot space, e.g. a relatively small flue gas exhaust system plot space, may be required, which in itself may be advantageous.

The transition flue gas duct may have an inlet and an outlet through which the flue gas flows horizontally, in the same direction as in the convection section. The pressure and temperature of flue gas inside and outside the stack may differ.

In embodiments, the stack can be placed substantially directly after the convection section, e.g. right after the last coils of the convection section and, seen from above, said stack may be located between said convection section and a fan. Although the flue gas flow can then still be directed from the convection section to the fan and from the fan to the stack, such that the fan is downstream of the convection section and the stack is downstream of the fan, the stack may succeed the convection section and may precede the fan with respect to the plot space placing.

Moreover, by arranging the transition flue gas duct between the outlet of the heat recovery system and the inlet opening of the stack such that it at least partly embraces a part of the stack, e.g. due to a relatively small plot space, may for example allow that the convection section may be placed in a horizontal configuration in a relatively high number of projects, e.g. also in projects in which otherwise not enough space would have been present for a horizontal convection section configuration. For example, in some projects not enough plot space would otherwise have been present due to that a relatively large plot arrangement would have been required in case of utilizing a conventional modular sequence in which a part of the convection section that is provided with the last coils is followed by a fan inlet leading flue gas to a fan from which it subsequently is fed towards a stack. Enabling the use of a substantially horizontal convection section configuration in projects in which otherwise a vertical convection section configuration would have been utilized may result in relatively low investment costs, relatively low maintenance costs and/or relatively low energy costs.

Besides, by arranging the transition flue gas duct between the outlet of the heat recovery system and the inlet opening of the stack such that it at least partly embraces a part of the stack, it may additionally or alternatively be counteracted that flue gas flowing through said stack cools down relatively much, as said at least partly embraced part of the stack can now be surrounded by relatively hot flue gas flowing through the transition flue gas duct. Flue gas flowing around said least partly embraced part of the stack while flowing through the transition flue gas duct may namely facilitate that the temperature of a wall or walls of the stack can be maintained at a sufficiently high level. Hence, lining provided at the inside of the flue gas stack and/or insulation, e.g. conventional insulation provided at the outside of the stack, may be omitted at least partly, while cooling of the stack and/or flue gas flowing through the stack may be counteracted substantially. Hence, it can be counteracted that there may be only a relatively small so-called stack effect due to heat losses. Additionally or alternatively, by keeping at least a part of the stack relatively warm by the arrangement in which said transition flue gas duct is at least partly embracing a part of the stack can provide a relatively efficient way to counteract condensation of flue gas in the stack, and may then thus for instance counteract corrosion problems in the stack.

Additionally or alternatively, the arrangement in which said transition flue gas duct is at least partly embracing a part of the stack may itself allow for savings in terms of supporting materials, such as for instance steel and/or concrete, as the stack can contribute in supporting other parts of the flue gas exhaust system and/or parts of the heat recovery system, such as for instance a convection duct of a convection section that can form, or at least be part of, the heat recovery system.

It is noted that the flue gas exhaust system may comprise a fluid accelerator, which may comprise a fan. Said fluid accelerator can be located in a fluid connection path between the heat recovery system outlet and the stack inlet opening. The fluid accelerator may facilitate flue gas extraction from the convection section of the steam reformer furnace or other industrial furnace, for instance to support the natural thermal draught or so-called upthrust, which phenomenon itself may also at least partly facilitate flue gas extraction from the convection section.

The fluid accelerator and/or the fluid connection path, especially a part of said fluid connection path which may form a housing of the fluid accelerator, can be provided with at least one flue gas inlet opening which is in fluid connection with a flue gas outlet opening of the transition flue gas duct, and may further be provided with at least one flue gas outlet opening in fluid connection with the inlet opening of the stack. Advantageously, said flue gas inlet opening and said flue gas outlet opening of the fluid accelerator and/or the fluid connection path may be located substantially above each other and/or substantially at the same side of the fluid accelerator.

For example, at least one of said one or multiple flue gas inlet openings and at least one of said one or multiple flue gas outlet openings can be provided substantially at a side of the fluid accelerator or its housing that is substantially facing the stack. This can be contrary to conventional arrangements in which the fan is provided substantially between the stack and the convection section, such that the outlet of the fan may face towards the stack and such that the inlet of the fan may face away from the stack and can face an outlet of said convection section. An arrangement in which said transition flue gas duct is at least partly embracing a part of the stack may facilitate arranging the inlet and the outlet of the fan substantially at the same side of the fan, but for instance at different height levels, which may for instance facilitate a relatively small plot size.

The part of the stack at least partly surrounded or embraced by the transition flue gas duct can for instance be formed by a lower part of the stack. Said at least partly embraced stack part can for example extend in a height direction over a substantial part of the height of the stack, e.g. over at least 20%, at least 25%, at least 30% or even at least 35% of the height of the stack, such as for instance over about the half of the height of the stack.

Since the height of a horizontally extending convection section, e.g. a convection section having its main convection duct or ducts extending substantially horizontally, of an industrial furnace, especially a steam reforming furnace, can typically be larger than the width of said horizontally extending convection section, the arrangement of a transition flue gas duct at least partly surrounding a part of the stack can be relatively advantageous, because said transition flue gas duct, which may have a height corresponding to the relatively large height of the convection section may then be relatively high. This can have multiple advantages. For example, the stack may be kept relatively warm over a relatively large height. Additionally or alternatively, the stack may be used to support ducting, which for instance may reduce the amount of structural steel for supporting such ducting.

It is noted that the present disclosure also relates to a transition flue gas duct. Further, the disclosure relates to an industrial furnace, especially a steam reforming furnace or a so-called fired steam reformer. Moreover, the disclosure also relates to a plant, especially a steam reforming plant.

Said industrial furnace and/or said plant may comprise an embodiment of a flue gas exhaust system according to an aspect of the present disclosure. Advantageously, the industrial furnace may further comprise a heat recovery system that comprises a so-called convection section, wherein said convection section extends substantially horizontally. This is, one or multiple main convection ducts of said convection section may extend substantially horizontally.

Utilizing a substantially horizontal convection section can be advantageous over utilizing a substantially vertical convection section. For example, convection coils of the convection section may be placed substantially transverse to the substantially horizontal direction of a convection section main duct, for instance such that said coils can extend in a substantially vertical direction, e.g. by hanging said coils in said convection section duct. Placing convection coils in a substantially horizontally extending convection section main duct can be done relatively easily in comparison to providing convection coils substantially transverse with respect to a substantially vertically extending convection section main duct. This, because structural elements, such as supports for the convection coils, e.g. supports formed by tube-sheet for maintaining a preset spacing between the coils, may be omitted at least partly in case of a horizontal configuration of the convection section main duct, which then may lead to significant material savings.

Figure 2:
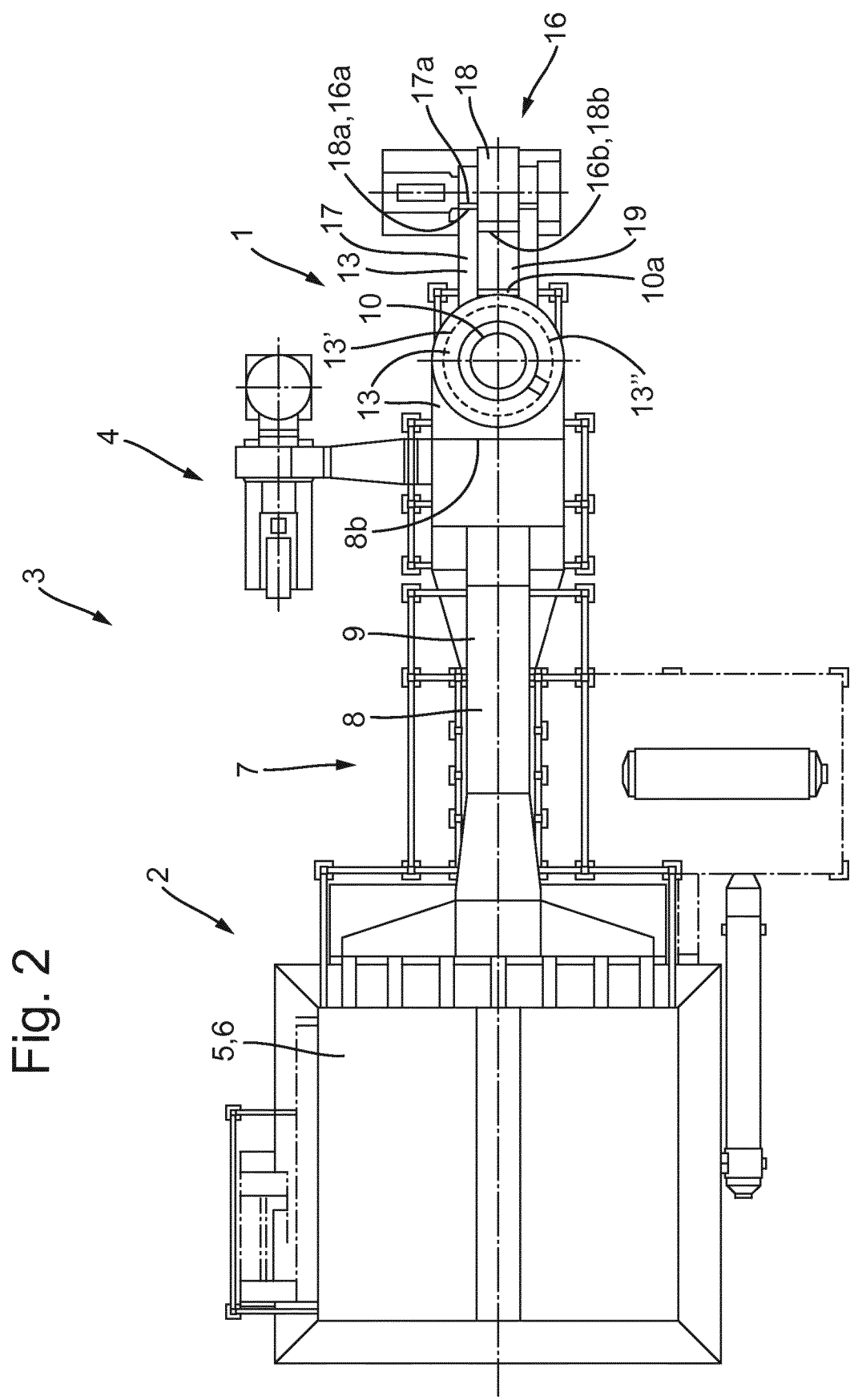

By way of non-limiting examples only, embodiments of the present disclosure will now be described with reference to the accompanying figures in which:

FIG. 1 shows a schematic perspective view of an embodiment of a flue gas exhaust system according to an aspect of the disclosure; and FIG. 2 shows a schematic top view of an embodiment of a plant comprising an industrial furnace which is provided with the flue gas exhaust system of FIG. 1.

It is noted that the figures show merely preferred embodiments according to the present disclosure. In the figures, the same or similar reference signs or numbers refer to equal or corresponding parts.

FIG. 1 shows a schematic perspective view of an embodiment of a flue gas exhaust system 1. As can be seen in FIG. 2, which shows an exemplary embodiment of a plant 3 provided with an industrial furnace 2, said flue gas exhaust system 1 can be arranged for an industrial furnace 2, especially a steam reforming furnace 2 or so-called fired steam reformer 2 or so-called reformer 2. For example, the steam reforming furnace 2 can be arranged for hydrogen production, methanol production, ammonia production, carbon monoxide production, or production of another useful product. It is appreciated that the steam reforming furnace 2 can thus be understood as being a processing device 2 for steam reforming, especially for reacting steam at a relatively high temperature with fossil fuel. The steam reforming may for instance be for producing syngas for hydrogen production. Alternatively or additionally, the steam reforming may be for producing carbon monoxide, hydrogen or other useful products from hydrocarbon fuels such as natural gas. For example, the steam reformer 2 may be a steam methane reformer, which is a steam reformer used for making hydrogen.

The industrial furnace 2, e.g. a direct fired heater, may comprise one or multiple burners 5 for burning with the aid of air provided from an air blower or so-called combustion air fan 4. The burner(s) 5 can be placed in a part of the furnace 2 which is known as a radiant section 6 or so-called firebox 6. The combustion can take place in said radiant section 6, and heat can be transferred there, especially by radiation, to tubes provided in the radiant section 6, thereby heating up fluid inside said tubes. It is noted that the actual steam reforming process, which may require relatively high temperatures, may take place inside said tubes.

It is noted that the industrial furnace 2 may comprise a heat recovery system 7 that may comprise a so-called convection section 8 which can be placed downstream of the radiant section 6. In said convection section 8, heat may be recovered from flue gas leaving the firebox 6 or so-called radiant section 6. In said convection section 8, heat recovery may for instance take place mainly by means of convective heat transfer from the flue gas to piping, tubes, especially formed by so-called coils, which are provided in said convection section 8 and through which piping, tubes or coils a fluid flows.

One or multiple main convection ducts 9 of said convection section 8 can preferably extend substantially horizontally. Then, the coils or so-called convection coils of the convection section 8, which preferably may be placed substantially transverse to the direction of the convection section duct or convection section main duct 9, can extend in a substantially vertical direction, e.g. by hanging said coils in said convection section duct 9. This may be economical, e.g. because relatively few structural elements, such as supports for the convection coils, may then be required.

As mentioned, the industrial furnace 2 can further comprise a flue gas exhaust system 1, an embodiment of which is shown in FIG. 1.

The industrial furnace 2 comprises a stack 10 or so-called flue gas stack 10, which can be a type of chimney and which can be arranged for venting the flue gas to the atmosphere. Thereto, the stack 10 may comprise at least one gas channel or so-called flue. The stack 10 may extend substantially upwardly and may preferably be formed as a substantially cylindrical structure, especially a substantially round cylindrical structure.

The stack 10 has an inlet opening 10a, which preferably can be provided at a lower end region of said stack 10, and which may be for introducing flue gas into the stack 10. Further, the stack 10 has an outlet opening 10', which may preferably be provided at an upper end region of said stack 10, for exhausting flue gas. Said inlet opening 10a of the stack 10 is in fluid connection with an outlet 8b of the heat recovery system 7, especially an outlet 8b of a so-called convection section 8, of the industrial furnace 2.

Said fluid connection between said heat recovery system outlet 8b and said stack inlet opening 10a comprises a transition flue gas duct 13 that at least partly embraces a part of the stack 10, especially a lower part of the stack 10. The fact that the transition flue gas duct 13 at least partly embraces a part of the stack 10 means that flue gas in the transition flue gas duct 13 at least partly embraces the outside wall 14 of that part of the stack 10. Said transition flue gas duct 13 can directly embrace and/or directly contact the respective part of the stack. For example, at least a part of a wall 14 or walls 14 of the stack 10 can be integrated within the transition flue gas duct 13. The outside wall 14 of a part of the stack 10 can thus form a part of a wall 15 defining at least a part of the transition flue gas duct 13, wherein the flue gas in the transition flue gas duct 13 is present radially beyond the outside wall 14 of said part of the stack 10. The outside wall 14 of said part of the stack 10 radially separates flue gas in the transition flue gas duct 13 from the interior of the stack 10. The space in the the transition flue gas duct 13 between the outer wall of the transition flue gas duct 13 contains flowing flue gas.

It will be appreciated that flue gas will be relatively hot and will be much warmer than the ambient air, and that the stack 10 can thus operate at least partly by buoyancy or natural thermal draught, or so-called upthrust or the so-called stack effect or chimney effect. Nevertheless, the flue gas exhaust system 1 can further comprise a fluid accelerator 16. Said fluid accelerator 16, which preferably may comprise a fan or so-called blower, can be arranged for propelling the flow of flue gas to be exhausted by the stack 10, e.g. if the natural thermal draught is not sufficient. It is noted that the fluid accelerator 16 may for instance be located in a fluid connection path 13, 17, 18, 19 between the heat recovery system outlet 8*b* and the stack inlet opening 10*a*.

The fluid accelerator 16 may comprise a housing 18 in which the actual fan can be provided. Said housing 18 may form part of the fluid connection path 13, 17, 18, 19 between the heat recovery system outlet 8*b* and the stack inlet opening 10*a*.

In embodiments, the fluid accelerator 16, e.g. by virtue of its housing 18, can be provided with at least one flue gas inlet opening 16*a*, 18*a* in fluid connection with a respective flue gas outlet opening 17*a* of the transition flue gas duct 13. Further, the fluid accelerator 16, e.g. by virtue of its housing 18, can be provided with a flue gas outlet opening 16*b*, 18*b* in fluid connection with the stack inlet opening 10*a*, which preferably may be located at or near the bottom of the stack 10.

Flue gas leaving the convection section 8 can thus follow the fluid connection path 13, 17, 18, 19 towards the stack inlet opening 10*a* and can be propelled or accelerated to expel the flue gas at a desired rate. Thereby, the relatively hot flue gas may surround a respective stack part at least partly, such that said part of the stack can be kept relatively warm to at least some degree by said flue gas then flowing along the outer wall 14 of the stack 10. Hence, an insulation layer can be formed that protects the stack 10 from cooling caused by external climate conditions, thereby counteracting the risk of corrosion resulting from condensation in the stack 10, especially condensation of sour water. In this context, it is noted that the flue gas in a stack portion surrounded at least partly by the transition flue gas duct 13 actually may have a higher temperature than the temperature of the flue gas in said transition flue gas duct 13, for instance as a result of a temperature raise due to flue gas compression by a fan 16 or other fluid accelerator 16.

Another advantage of the proposed layout may lie in that it can offer an improved noise dampening due to the transition flue gas duct 13 that at least partly embraces a part of the stack 10, and which may substantially surround the bottom of the stack. For example, it can allow implementing a silencer or silencer system in the stack, preferably substantially directly above the height level of the transition flue gas duct at least partly surrounding said stack. At that location, the flue gas flow pattern may be relatively homogeneous, and said location may be sufficiently distant from the turbulences created by the fan and/or by a bent duct leading for guiding flue gas from the fan to the stack. As a result, a pressure drop created by the silencer can be relatively predictable and/or the silencer can be of relatively simple design. Each of this can form a significant advantage compared to a conventional stack layout in which the silencer is provided right at the outlet of the fan.

In the shown exemplary embodiment, when seen from above, such as for instance is the case in FIG. 2, the heat recovery system 7 and the fluid accelerator 16 can be located substantially at opposite sides of the stack 10. Additionally or alternatively, when seen from above, the outlet 8*b* of the heat recovery system 7 and the inlet 16*a*, 18*a* of the fluid accelerator 16 can be located substantially at opposite sides of the stack 10. This may facilitate that flue gas can be guided along a relatively large portion of the outer wall without having to deflect the flue gas flow to a relatively large extent.

Advantageously, the transition flue gas duct 13 may comprise a left flank 13' extending along a left side of the stack 10 and a right transition flue gas duct flank 13" extending along a right side of the stack 10. This may facilitate that flue gas can be guided along a relatively large portion of the outer wall without having to deflect the flue gas flow to a relatively large extent. Both transition flue gas duct flanks 13', 13" can be formed by separate ducts. However, as another example, both flanks 13', 13" may alternatively be integrated, e.g. such that their internal spaces meet at a location substantially opposite to an inlet opening of the transition flue gas duct 13, which inlet opening can be in fluid connection with an outlet opening 8*b* of the heat recovery system 7 or of its convection section 8.

As for instance can be seen in FIG. 1, the transition flue gas duct 13 may comprise at least one fluid accelerator inlet duct 17 for connection to an inlet 16*a*, 18*a* of the fluid accelerator 16. In embodiments, for instance in case the transition flue gas duct 13 comprises multiple, especially two, transition flue gas duct flanks 13', 13", the transition flue gas duct 13 can comprise multiple, e.g. two, fluid accelerator inlet ducts 17.

It is noted that the present disclosure also relates to a transition flue gas duct 13 as such. Said transition flue gas duct 13 may then be for providing at least a part of a fluid connection path 13, 17, 18, 19 between an outlet 8*b* of a heat recovery system 7 of an industrial furnace 2 and an inlet 10*a* of a stack 10 for exhausting flue gas exiting said heat recovery system 7, wherein the transition flue gas duct 13 is arranged for at least partly surrounding or embracing a part, especially a lower part, of the stack 10.

The transition flue gas duct 13 may allow flue gas to flow from a last module of the convection section 8 to a fluid accelerator 16*a*, which for instance may comprise a fan.

Additionally or alternatively, the transition flue gas duct 13 can be provided with one or multiple connecting duct parts 19 for connecting the stack inlet opening 10*a* to an outlet opening 16*b* of the fluid accelerator 16, e.g. an outlet opening 18*b* of a part of the accelerator that forms a housing 18 for a fan or blower. During use, an inlet 19*a* of said connecting duct part 19 can be in fluid connection with a flue gas outlet opening 16*b*, 18*b* of the fluid accelerator 16 or its housing 18.

It is noted that for the purpose of clarity and a concise description features are described herein as part of the same or separate embodiments, however, it will be appreciated that the scope of the present disclosure may include embodiments having combinations of all or some of the features described.

Further, it is noted that the present disclosure is not restricted to the embodiments described herein and that the appended claims are not restricted to the embodiments described herein. It will be understood that many variants are possible.

Such variants will be apparent for the person skilled in the art and are considered to lie within the claimed scope as formulated in the following claims.

The invention claimed is:

1. Flue gas exhaust system for an industrial furnace comprising a stack having an inlet opening for introducing flue gas into the stack and an outlet opening for exhausting flue gas, wherein the inlet opening of the stack is in fluid connection to an outlet of a heat recovery system of the industrial furnace, and wherein the fluid connection between said heat recovery system outlet and said stack inlet opening comprises a transition flue gas duct that at least partly embraces a part of the stack thereby allowing flue gas to flow around said at least partly embraced part of the stack while said flue gas flows through the transition flue gas duct.

2. The flue gas exhaust system according to claim 1, wherein the part of the stack at least partly embraced by the transition flue gas duct is formed by a lower part of the stack.

3. The flue gas exhaust system according to claim 1, further comprising a fluid accelerator.

4. The flue gas exhaust system according to claim 3, wherein the fluid accelerator is located in a fluid connection path between the heat recovery system outlet and the stack inlet opening.

5. The flue gas exhaust system according to claim 3, wherein the fluid accelerator is provided with a flue gas inlet opening in fluid connection with a flue gas outlet opening of the transition flue gas duct, and wherein the fluid accelerator further is provided with a flue gas outlet opening in fluid connection with the inlet opening of the stack.

6. The flue gas exhaust system according to claim 3, wherein, when seen from above, the heat recovery system and the fluid accelerator are located substantially at opposite sides of the stack.

7. The flue gas exhaust system according to claim 3, wherein, when seen from above, the outlet of the heat recovery system and the inlet of the fluid accelerator are located substantially at opposite sides of the stack.

8. The flue gas exhaust system according to claim 1, wherein the transition flue gas duct comprises a left flank and a right flank, the left transition flue gas duct flank extending along a left side of the stack and the right transition flue gas duct flank extending along a right side of the stack.

9. The flue gas exhaust system according to claim 3, wherein the transition flue gas duct comprises at least one fluid accelerator inlet duct for connection to an inlet of the fluid accelerator.

10. Transition flue gas duct, arranged for use in the flue gas exhaust system according to claim 1.

11. Industrial furnace comprising the flue gas exhaust system according to claim 1.

12. The industrial furnace according to claim 11, further comprising the heat recovery system that comprises a so-called convection section, wherein one or multiple main convection ducts of said convection section are extending substantially horizontally.

13. The industrial furnace according to claim 11, wherein a steam reforming furnace is arranged for hydrogen production, methanol production, ammonia production, carbon monoxide production, or production of another useful product.

14. Plant comprising the transition flue gas duct according to claim 10.

15. The flue gas exhaust system according to claim 1, wherein the industrial furnace is a steam reforming furnace.

16. The flue gas exhaust system according to claim 3, wherein the fluid accelerator includes a fan.

17. The industrial furnace according to claim 11, wherein the industrial furnace is a steam reforming furnace.

18. Plant comprising the flue gas exhaust system according to claim 1.

19. Plant comprising the industrial furnace according to claim 11.

* * * * *